Nov. 6, 1962 D. KAIDAN 3,062,991

QUICK ATTACHING AND DETACHING CIRCUIT SYSTEM

Filed Sept. 8, 1958

INVENTOR.

DAVID KAIDAN

BY Walter J. Kreske

ATTORNEY 3,062,991

QUICK ATTACHING AND DETACHING CIRCUIT SYSTEM

David Kaidan, Randolph, Mass., assignor to General Electronic Laboratories, Inc., Cambridge, Mass., a corporation of Massachusetts Filed Sept. 8, 1958, Ser. No. 759,582
8 Claims. (Cl. 317—101)

This invention relates to systems for making electric circuits and more particularly to systems for making electric circuit connections having capacity for rapid manual and electrical attachment and detachment of circuit components.

This invention is an improvement over a system for making electric circuit connections described in application Secial No. 363,208, filed June 22, 1953, and now Patent No. 2,878,587. The system therein disclosed is based upon the use of electric circuit components being permanently mounted on rigid mounting members or blocks which necessitate the relatively expensive supply of and need for a separate mounting block for each electric circuit component desired to be used in the circuit. The present invention not only succeeds in removing the need for the use of mounting blocks with its resultant saving in cost, but also achieves a high degree of versatility in the rapid assembly and disassembly of desired electric circuits. The versatility of the present invention is such that it may be compatibly used with the above mentioned existing system or without the above mentioned system, as desired, thus combining and making available the advantages of an existing system along with the additional advantages of the present invention.

Accordingly, a primary object of the present invention is the provision of a system for electric circuit connections capable of rapid assembly and disassembly of electric circuits which is highly versatile, inexpensive and convenient to use.

Another object is the provision of a system which permits rapid assembly and disassembly of electrical circuits manually.

A further object is the provision of a system for rapid assembly and disassembly of electric circuits which does not require the use of solder nor other solidifying liquids in making the rapid electrical connections between components.

And a further object is the provision of a system having capacity for rapid assembly and disassembly of electric circuits which is applicable for use with or without rigid mounting members for the electric components.

And another object of the invention is the provision of electric circuit components with electrically conductive elements fixed to electric coupling clips capable of rapid manual attachment and detachment to electrically conductive terminals.

And a still further object is the provision of a system for making electric circuits wherein the circuit components may be manually coupled into a circuit or removed therefrom without special tools of any kind and without impairing usability of the component in other circuits.

And a still further object is the provision of a system for rapidly assembling and disassembling electric circuits without the need for permanent mounting of the circuit components on rigid mounting blocks, or without the need for any mounting block whatsoever.

And a still further object is the provision of a reliable, convenient to use, and inexpensive system for making electric circuits characterized by its extreme versatility and the rapidity with which the circuits may be assembled and disassembled manually without auxiliary tools.

These and other objects, features and advantages of the invention will become more apparent from the following description taken in connection with the accompanying drawings of preferred embodiments of the invention and wherein.

Figures 1, 2, 3, 4, 5, 6, 7, 9:
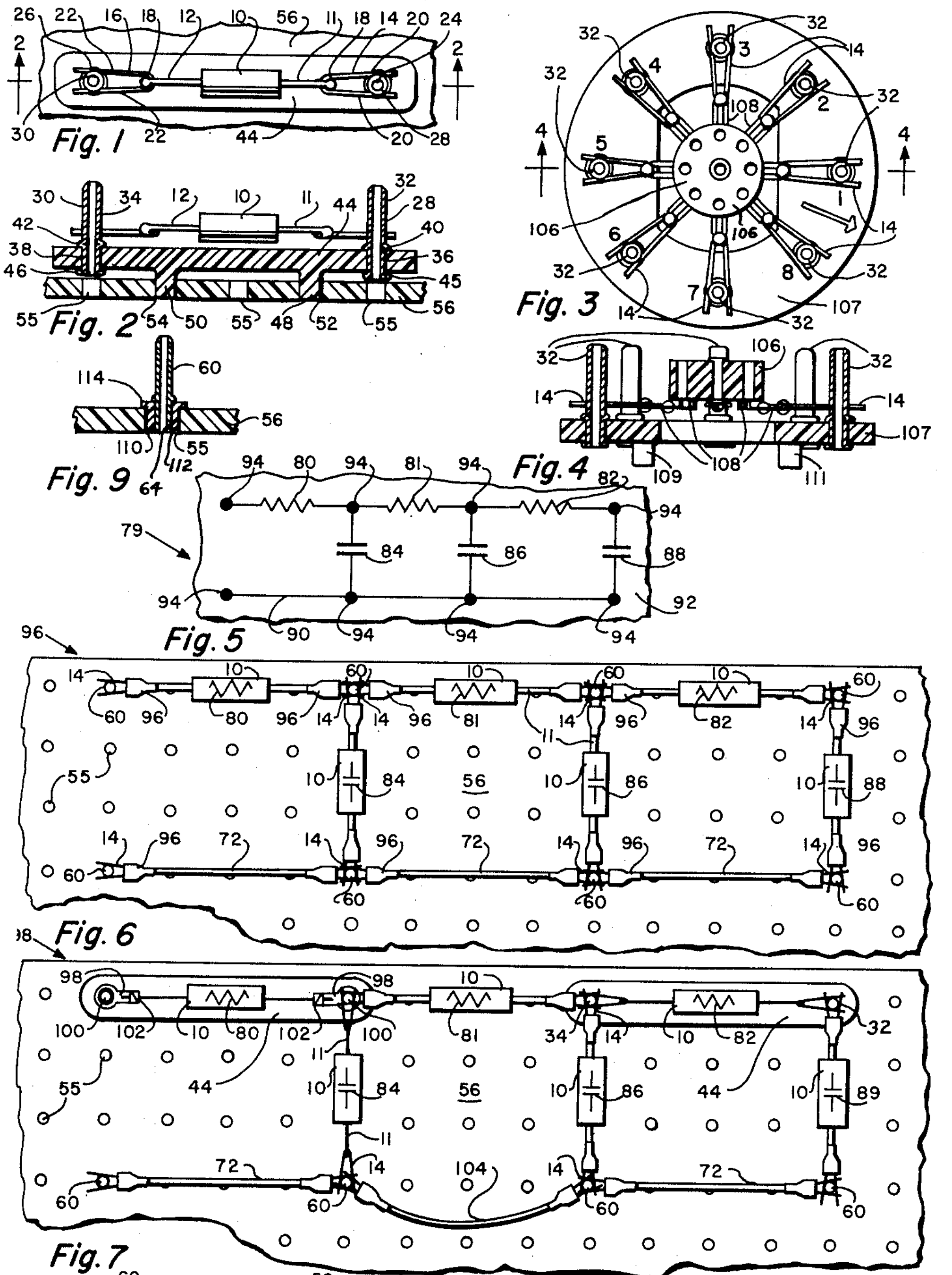
FIG. 1 is a top view of one embodiment constructed and arranged in accordance with the present invention.
FIG. 2 is a side view on line 2—2 of the embodiment shown in FIG. 1.
FIG. 3 is a top view of another embodiment constructed and arranged in accordance with the present invention.
FIG. 4 is a cross sectional view on line 4—4 of the embodiment shown in FIG. 3.
FIG. 5 is a schematic view of an exemplary circuit structure for more clearly describing the present invention.
FIG. 6 is a top view of a perforated panel with a circuit thereon constructed and arranged in accordance with the present invention.
FIG. 7 is a top view of a perforated panel with a circuit thereon constructed and arranged in an alternative manner in accordance with the present invention.
FIG. 9 is a cross sectional view of a portion of a panel with an alternative terminal post structure shown therein.

Referring to FIGS. 1 and 2 in more detail, an electric circuit component arranged for rapid circuit coupling and decoupling in accordance with the present invention is designated generally by the numeral 10. The electric circuit component 10 may be any suitable capacitor, resistor, inductor, diode, or other electrical device desired for insertion in an electric circuit as will hereinafter be further described. The electric circuit component 10 has electrically communicating therewith a pair of electrically conductive elements 11 and 12, such as copper wire, fixed in electrical engagement with a pair of electric coupling clips 14 and 16 respectively. The electrical engagement may be effected by a mechanical or solder connection 18 or other suitable means. The clips 14 and 16 are of an electrically conductive material which preferably also has resilient spring properties such as bronze or beryllium copper. By way of example and not limitation, the clips described in Patent Number 2,578,360 are particularly suitable for use as the clips 14 and 16. In the present instance the clips 14 and 16 have substantially parallel legs 20 and 22 respectively on the facing sides of which are cylindrical segment recesses 24 and 26 respectively which, because of the spring action of the clips, securely grip body portions 28 and 30 respectively of terminal posts 32 and 34. The terminal posts 32 and 34 may be of solid or of hollow construction, such as readily made on eyelet machines. They are preferably of such electrically conductive material as brass or copper and may desirably have a nickel or other electrically conductive plating on their surfaces, as may also be on the clips 14 and 16, to insure a long life of low electrical contact resistance. By this conductive element and clip construction, the component 10 is rigidly held in electrical engagement with the terminal posts 32 and 34 by means of the coupling clips 14 and 16. The component 10 may, nevertheless, be readily removed for use in any desired circuit using the system of the present invention by either sliding the clips 14 and 16 upwardly over the body portions 28 and 30, or by merely pulling the component 10 so as to manually pull the clips laterally away from the terminal posts 32 and 34 with sufficient force to cause the spring action of the clips to release their grip on the terminal posts 32 and 34.

The terminal posts 32 and 34 in FIGS. 1 and 2 have base portions 36 and 38 respectively with flange or shoulder portions 40 and 42. The base portions 36 and 38 may be of similar shape and dimension as the body portions 28 and 30. The base portions 36 and 38 engage in holes, as shown, in a rigid mounting member or block 44 and are permanently held in place in the rigid mounting member 44 between flanges 40 and 42 and flared base ends 45 and 46. The rigid mounting member 44 is preferably made of dielectric material and may be of molded plastic construction such as of molded polystyrene, urea, epoxy or other suitable material. The rigid mounting member 44 also has a pair of downwardly depending projections 48 and 50 which may be of the same diameter as the base portions 36 and 38. The projections 48 and 50 frictionally engage in holes 52 and 54 respectively in a panel 56 preferably of dielectric material such as pressed fiber board, wood, cardboard, phenolic resin or other suitable material. Other holes 55 which may be in columns and rows equally spaced from each other are provided in the panel 56 to insure wide selection of placement of such mounting blocks 44 and other structures to be hereinafter further described.

Figure 8:
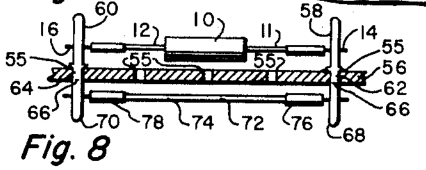
FIG. 8 is a cross sectional view of a portion of a panel with other structure illustrating a further embodiment of the invention.

By way of further versatility of the present invention, reference is made to FIGS. 6, 7 and particularly FIG. 8 wherein terminal posts 58 and 60 may be placed directly in any of the holes 55 in the panel 56 rather than being used in the rigid mounting member 44. In such instance the base portions 62 and 64 will be either of two selected lengths, one designated as that to the dotted lines 66, in which instance they do not protrude beneath the bottom surface of the panel 56. The base portion 62 and 64 may alternatively be elongated to provide exposed base terminals 68 and 70 respectively to allow or permit the use of a connector 72 composed of an electric cable 74, which may if desired have an insulating covering thereon, and at the ends of the cable 74, two spring clips 76 and 78 gripping and in electrical engagement with the base terminals 68 and 70 respectively for providing electrical conductive connection between terminal posts 58 and 60 for purposes to be hereinafter described. The clips 76 and 78 may be similar to the clips 14 and 16 described in connection with FIGS. 1 and 2. In the present instance in FIG. 8, as an alternative arrangement, the electrical circuit component 10 may be electrically coupled by coupling clips 14 and 16 to the terminal posts 58 and 60 directly in the holes 55 in the panel 56 without the need for a rigid mounting block 44 such as used in the embodiment shown in FIGS. 1 and 2. In the event that for some reason the circuit component 10 is desired to be shorted out of an electric circuit, a connector 72 as shown in FIG. 8 may be coupled to the base terminals 68 and 70 to effect such shorting out of the electric circuit component 10. This shorting out connection may be desirable in cases where student problems are created in instructional circuit work. The connector 72 being at the bottom side of the panel 56 is not visible to the student who then must seek the source and cause of the circuit malfunction as part of his assigned lesson. Also it may be desired to use the connector 72 for any other electrical connection on either the top or bottom side of the panel 56 whether or not electric circuit component 10 is present.

By way of illustrating an exemplary application of the embodiment shown in FIGS. 1, 2 and 8 in practical circuit work, reference is made in particular to FIGS. 5, 6 and 7.

FIGURE 5 is a schematic diagram of a circuit 79 comprised of three series connected resistors 80, 81 and 82 with capacitors 84, 86 and 88 connected in parallel from terminals between the resistors to a common electric line 90. The schematic circuit diagram 79 as shown appears in the present instance in the form of a template 92. The template 92 appears in FIG. 5 to smaller scale than the drawings in FIGS. 6 and 7 but is in actual size of the same dimension as the embodiments shown in FIGS. 6 and 7. The template 92 may be of any suitable material such as a sheet of paper, plastic film, preferably opaque, but for some applications may desirably be on transparent film, or it may even be directly a diagram on the panel 56 in place of a separate template 92.

The template 92 has holes 94 at suitable terminal post positions for electrically coupling the electrical components schematically known thereon. The spacing between the terminal post holes 94 follows the same dimensioning and pattern as the holes 55 in the panel 56, so that when the template 92 is placed over the top face of the panel 56 only the holes 55 in the panel 56 aligning with the holes 94 in the template 92 will be visible and available for insertion of the terminal posts such as terminal posts 58 and 60. In the present instance the FIGS. 6 and 7 illustrations do not have the template 92 placed thereon, but rather only use the schematic diagram 79 as the basic reference for assembling electric circuits 96 and 98 in two alternative arrangements to achieve the same basic circuit as that shown in the schematic circuit diagram 79.

In FIG. 6 is shown the creation of circuit 79 by the insertion of terminal posts 60 similar to those described in FIG. 8 at hole positions in the panel 56 corresponding to the positions of the holes 94 in the template 92. To these terminal posts 60 are coupled circuit components 10 described in FIG. 8 which are selected in the respective positions to have the same values of resistance or capacitance, as the case may be, as their corresponding values in the schematic diagram 79. Thus the resistance values of resistors 80, 81 and 82 in the schematic diagram 79 are used in the actual resistors 80, 81 and 82 in FIG. 6. The capacitive values of capacitors 84, 86 and 88 in the schematic diagram 79 are reproduced in actual capacitors 84, 86 and 88 in FIG. 6. These respective circuit components 10 in FIG. 6 are coupled to the respective terminal posts 60 by coupling clips 14 such as described with regard to FIGS. 1 and 2 except that in the present instance in FIG. 6 these clips 14 and the conductive elements 11 are shown covered by insulating material 96 such as tubular plastic material of dielectric character. Also, the common ground line represented by 90 in FIG. 5 is created by connectors 72 in FIG. 6 coupled to terminals 60 as shown. Or the clips 14 on the common line side of the capacitors 84, 86 and 88 may be of a length to connect to a single terminal post 60 and thereby eliminate the need for connectors 72.

Referring more particularly to FIG. 7, further versatility of the present invention is seen in an alternative arrangement of the schematically shown circuit 79 of FIG. 5. In FIG. 7 a resistor component 80 is permanently fixed to a mounting block 44 by lugs 98 permanently fixed to terminal posts 100. The component 80 is fixed to the lugs 98 by a mechanical or solder connection 102 in manner similar to that described in the above mentioned application Serial Number 363,208. The resistor component 82 in FIG. 7 is shown mounted on a mounting block 44 and arranged in similar manner to that described in FIGS. 1 and 2 and with fixed terminal posts 32 and 34. The resistor component 81 in FIG. 7 has no mounting block at all, but is still quickly and conveniently coupled into the circuit by means of the coupling clips 14 gripping the terminal posts 34 and 100. Also, the capacitors 84, 86 and 88 in FIG. 7 are conveniently coupled between terminal post 100 and terminal post 60, terminal posts 34 and 60, and terminal posts 32 and 60 as shown in FIG. 7. The capacitor 84 is shown with bare conductive leads 11 while the other components are shown with leads and clips covered with insulating material. If the conductive leads 11 are optionally made of such length and flexibility that they with the component 10 rest on the panel 56, then it is preferable to provide them with electrically insulating covering as described. Also, the common line 90 of FIG. 5 is created in FIG. 7 by the connectors 72 together with a connector 104 of any desired length having on the ends thereof the coupling clips 14 or other suitable type clips. The length of the connectors used is subject to convenience and election of the user. FIGURE 7 particularly illustrates the compatibility and versatility of applicant's present invention to varying optional structural arrangements.

It will be noted that in the use of circuit construction without mounting blocks 44, as shown in FIG. 6, the spacing between rows and columns of holes 55 may vary to a substantial degree without affecting the usability and ease of electrically inserting the circuit components 10 or the connectors 72 and 104 in the desired circuit. On the other hand, the spacing between holes 55 must be very accurately maintained where rigid mounting blocks such as the mounting block 44 are used with the downwardly projecting members 48 and 50. This accurate spacing is necessary in the case of the mounting blocks 44 to insure proper alignment of the projections 48 and 50 with the holes 55.

Referring to FIGS. 3 and 4 in more detail, it is seen that the present invention is applicable even to socket type bases 106 for electron tubes, transistors and the like by coupling to the electrically conductive elements 108 the coupling clips 14 in position to be inserted on terminal posts 32, or even directly onto the panel 56 on terminal posts 58 and 60. In the embodiments of FIGS. 3 and 4 the mounting member 107 is of circular configuration for convenience in use and has projections 109 and 111 similar to projections 48 and 50.

Referring to FIG. 9 in more detail, a further structure is shown for those situations where the holes 55 in the panel 56 are of a larger diameter than that of the base portion 64 of the terminal post 60. This may occur where the downwardly projecting members 48 and 50 have a diameter greater than the base portion 64. By making a filler sleeve 110 to fit the hole 55 and base portion 64 of the terminal 60 and providing a flare 112, the filler sleeve 110 is permanently fixed to the terminal post 60. The terminal post 60 can then be used in the larger hole 55 shown in FIG. 9 to construct circuits as shown in FIGS. 6 and 7. A shoulder or flange 114 on the filler sleeve 110 may be provided to prevent the terminal post from falling through the hole 55.

This invention is not limited to the specific details of construction and operation described as equivalents will suggest themselves to those skilled in the art. What is claimed is:

1. Electrical apparatus having in combination a plurality of terminals of electrically conductive material each terminal having a downwardly projecting member, a panel having a plurality of holes adapted to receive and retain the projecting members by friction alone and in manually removable relation to the hole, electrical components having electrically conductive elements with end-portions slidable laterally onto and off the terminals, and flexible connectors having end-portions slidable onto and off the terminals by hand alone in a direction substantially parallel to the face of the panel, whereby to permit removal of selected connectors from a terminal without disturbing other end-portions on said terminal.

2. Electrical apparatus having in combination a panel having a plurality of holes, terminals on the panel, each terminal having a projection frictionally engaging a hole in the panel with capacity for quick removal from the hole in the panel by hand alone, an electric circuit component having electrically conductive elements with end-portions in slidable and gripping engagement with the terminals and adapted to be pulled laterally off the terminals by hand alone whereby to permit removal from a terminal without disturbing other end portions on said terminal.

3. Electrical apparatus having in combination a panel, terminals on the panel above and away from the front of the panel in various locations and having means frictionally attaching the terminals to the front of the panel with capacity for removal therefrom by hand alone from the front of the panel, and electric circuit components having electrically conductive elements with end-portions adapted to be pushed laterally onto the terminals at the front of the panel by hand alone to make electrical contact therewith and to be pulled off a terminal laterally by hand alone for shift to another terminal while in each case the terminal remains in place on the panel.

4. In combination, a panel of dielectric material having a plurality of holes, a plurality of elongated terminal posts of electrically conductive material, each having a body and a base portion, the base portion adapted for insertion in a hole in the panel by hand alone for holding the terminal post in operative position on the panel with capacity for quick removal from the hole by hand alone, electric circuit components, each having fixed in electrical engagement therewith spring clips of electrically conductive material, the spring clips having provision for frictional attachment and quick manual detachment from the body of a terminal post by movement in a direction substantially parallel to the panel.

5. The combination as in claim 4 having additionally flexible connectors having end-portions in the form of said spring clips for electrical coupling of selected terminal posts by movement in a direction substantially parallel to the panel.

6. For a mounting member having a plurality of electrically conductive terminal posts extending above the mounting member, the combination of an electric plug-in base for a plug-in type electric circuit component, the base having a plurality of electrically conductive elements, a plurality of resilient pronged clips, each of the clips fixed to a respective one of the electrically conductive elements in position for pushing onto a respective one of the terminal posts for frictionally holding the terminal post between the prongs, with capacity for rapid manual attachment and detachment of the electric plug-in base from the terminal posts.

7. The combination of a panel having a multiplicity of holes, an electric circuit component, a rigid mounting member for the component, at least one projection associated with the mounting member engaging a hole in the panel for anchoring the mounting member in quick-detachable relation to the panel, electric terminal pins on said mounting member in manually accessible position above the panel while the member is in place on the panel, electrically conductive elements in electrical engagement with and extending from the component and having end-portions in the form of electrically conductive spring clips adapted to be pushed laterally onto the terminals by hand alone for frictionally holding the terminals in electrical connection therewith and to be pulled off laterally by hand alone for shift to other selected terminals while the mounting member and its terminals remain in place on the panel.

8. In combination, a panel of dielectric material having a plurality of holes, a plurality of elongated terminal posts of electrically conductive material, each having a body and base portions, the base portion adapted for manual insertion in a hole in the panel to frictionally hold the terminal post in operative position on the panel, the base portion extending in manually accessible position below the panel, and the body portion extending in manually accessible position above the panel, an electric circuit component having electrically conductive elements with end-portions in the form of spring clips in slidable and gripping engagement with respective terminal body portions with capacity for easy lateral removal from the terminal body portion by hand alone, and a flexible connector with end portions in the form of spring clips in slidable and gripping engagement with respective terminal base portions below the panel and adapted to be pulled laterally off the terminal base portions by hand alone.

References Cited in the file of this patent

UNITED STATES PATENTS

| | | |
|---|---|---|
| 2,066,876 | Carpenter | Jan. 5, 1937 |

| | | |
|---|---|---|
| 2,314,225 | Leece | Mar. 16, 1943 |
| 2,390,706 | Hearon | Dec. 11, 1945 |
| 2,477,653 | Roane | Aug. 2, 1949 |
| 2,533,483 | Losquadro | Dec. 12, 1950 |
| 2,568,535 | Ballard | Sept. 18, 1951 |
| 2,592,552 | Florez | Apr. 15, 1952 |
| 2,593,479 | Nieter | Apr. 22, 1952 |

FOREIGN PATENTS

| | | |
|---|---|---|
| 592,686 | Great Britain | Sept. 18, 1951 |